(12) United States Patent
Yonetani

(10) Patent No.: US 10,897,580 B2
(45) Date of Patent: Jan. 19, 2021

(54) OBSERVATION DEVICE THAT CONTROLS NUMERICAL APERTURE IN ACCORDANCE WITH SPECIFIED OBSERVATION SCOPE

(71) Applicant: OLYMPUS CORPORATION, Hachioji (JP)

(72) Inventor: Atsushi Yonetani, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 55 days.

(21) Appl. No.: 16/001,202

(22) Filed: Jun. 6, 2018

(65) Prior Publication Data

US 2018/0359404 A1  Dec. 13, 2018

(30) Foreign Application Priority Data

Jun. 7, 2017 (JP) .................................. 2017-112551

(51) Int. Cl.

| | |
|---|---|
| H04N 5/235 | (2006.01) |
| G02B 21/36 | (2006.01) |
| H04N 5/238 | (2006.01) |
| H04N 5/232 | (2006.01) |
| H04N 5/225 | (2006.01) |

(52) U.S. Cl.
CPC ......... *H04N 5/2354* (2013.01); *G02B 21/361* (2013.01); *G02B 21/368* (2013.01); *H04N 5/238* (2013.01); *H04N 5/2352* (2013.01); *H04N 5/23212* (2013.01); *H04N 5/23293* (2013.01); *H04N 5/2254* (2013.01); *H04N 5/2256* (2013.01)

(58) Field of Classification Search
CPC .. G02B 21/361; G02B 21/368; H04N 5/2254; H04N 5/2256; H04N 5/2354; H04N 5/238
See application file for complete search history.

(56) References Cited

U.S. PATENT DOCUMENTS

| | | |
|---|---|---|
| 6,075,646 A | 6/2000 | Suzuki |
| 2003/0165021 A1 | 9/2003 | Kawasaki |

(Continued)

FOREIGN PATENT DOCUMENTS

| | | |
|---|---|---|
| JP | H08190056 A | 7/1996 |
| JP | H09186917 A | 7/1997 |

(Continued)

*Primary Examiner* — Francis Geroleo
(74) *Attorney, Agent, or Firm* — Holtz, Holtz & Volek PC

(57) ABSTRACT

An observation device 1 includes an imaging optical system 8 that forms an image on the basis of light from sample S, an aperture diaphragm 2 that changes a numerical aperture on an emission side of the imaging optical system 8, a camera 5 that converts the image of the sample into image signals, the image of the sample being formed by the imaging optical system 8, an observation scope changing unit that performs an observation scope changing process in which an observation scope is changed to a specified scope by changing an extraction scope, the extraction scope being a scope from which the image signals obtained by the camera 5 are extracted, a monitor 33 that displays the image signals from the specified scope obtained through the observation scope changing process, and a control unit that controls the aperture diaphragm 2 in accordance with the specified observation scope.

17 Claims, 12 Drawing Sheets

(56) References Cited

U.S. PATENT DOCUMENTS

| | | | |
|---|---|---|---|
| 2006/0092504 A1 | 5/2006 | Hayashi | |
| 2012/0236137 A1* | 9/2012 | Kawashima | G02B 5/005 348/79 |
| 2013/0088776 A1* | 4/2013 | Nakayama | G01N 21/6458 359/381 |
| 2014/0015954 A1* | 1/2014 | Tsujimoto | G02B 21/36 348/79 |
| 2016/0282592 A1* | 9/2016 | Abe | G02B 15/163 |

FOREIGN PATENT DOCUMENTS

| | | | |
|---|---|---|---|
| JP | 2003066333 A | 3/2003 | |
| JP | 2006084825 A | 3/2006 | |
| JP | 2007213103 A | 8/2007 | |
| JP | 2010048841 A | 3/2010 | |
| JP | 2012194503 A | 10/2012 | |
| JP | 2013007849 A | 1/2013 | |
| WO | WO-2015087619 A1 * | 6/2015 | G02B 15/16 |

\* cited by examiner

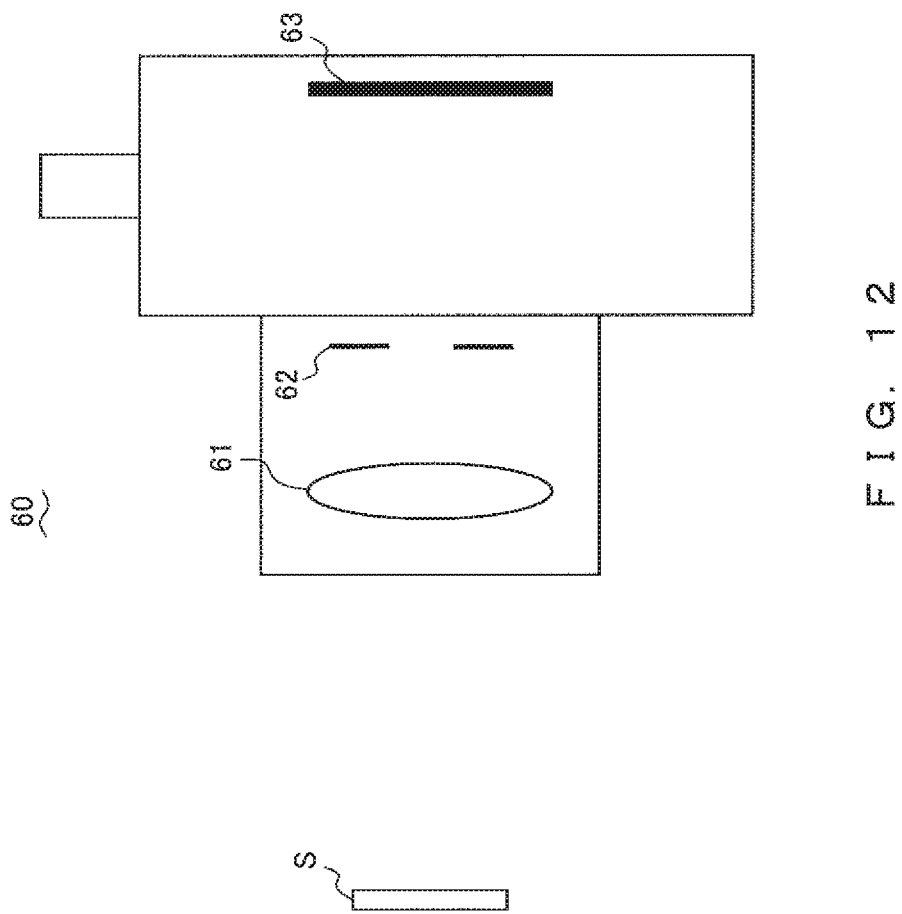

OBSERVATION DEVICE THAT CONTROLS NUMERICAL APERTURE IN ACCORDANCE WITH SPECIFIED OBSERVATION SCOPE

CROSS REFERENCE TO RELATED APPLICATIONS

This application is based upon and claims the benefit of priority from prior Japanese Patent Application No. 2017-112551, filed Jun. 7, 2017, the entire contents of which are incorporated herein by this reference.

BACKGROUND OF THE INVENTION

Field of the Invention

The present invention is related to an observation device that optically performs observation of an object and image pickup of the object.

Description of the Related Art

The following various methods have conventionally been known for changing the observation scope in an observation device that optically performs observation of an object and image pickup of an object. Examples of such methods for microscopes include, among others, a method in which a revolver having a plurality of objectives with different magnifications revolves to change the observation scope, a method in which the objective itself has a zoom magnification function, which changes the observation scope (Japanese Laid-open Patent Publication No. 2003-66333 and Japanese Laid-open Patent Publication No. 2007-213103), a method in which the afocal portion between the objective and the tube lens has a zoom magnification function, which changes the observation scope (Japanese Laid-open Patent Publication No. 2006-84825), a method in which the optical path is segmented, each segment has a different projection magnification, and the segments are appropriately selected to change the observation scope (Japanese Laid-open Patent Publication No. 8-190056).

Also, in cameras etc., the photography optical system and the finder optical system has a zoom magnification function or a focal length switching function. Changing the observation range (imaging range) by these functions is widely known. a method for which change the observation scope (photography scope).

Another method such as electronic scaling (digital zooming, electronic zooming, etc.) is also known. The electronic scaling is process that changes the observation scope by extracting part of image information. The image information is resulting from conversion from optically-collected information into an electric signal using a detection unit such as an image pickup element.

SUMMARY OF THE INVENTION

An observation device according to a first aspect of the present invention is an observation device for observing an object. The observation device includes an imaging optical system that forms an image on the basis of light from the object, a numerical aperture changing unit that changes the numerical aperture on an emission side of the imaging optical system, a detection unit that converts the image of the object into image signals, the image of the object being formed by the imaging optical system, an observation scope changing unit that performs an observation scope changing process in which an observation scope is changed to a specified scope by changing an extraction scope, the extraction scope being a scope from which the image signals obtained by the detection unit are extracted, a display unit that displays the image signals from the specified scope obtained through the observation scope changing process, and a control unit that controls the numerical aperture changing unit in accordance with the specified observation scope.

BRIEF DESCRIPTION OF THE DRAWINGS

The present invention will be more apparent from the following detailed description when the accompanying drawings are referenced.

FIG. 12 illustrates a configuration of a camera according to the fourth embodiment.

DESCRIPTION OF THE EMBODIMENTS

Figure 1:
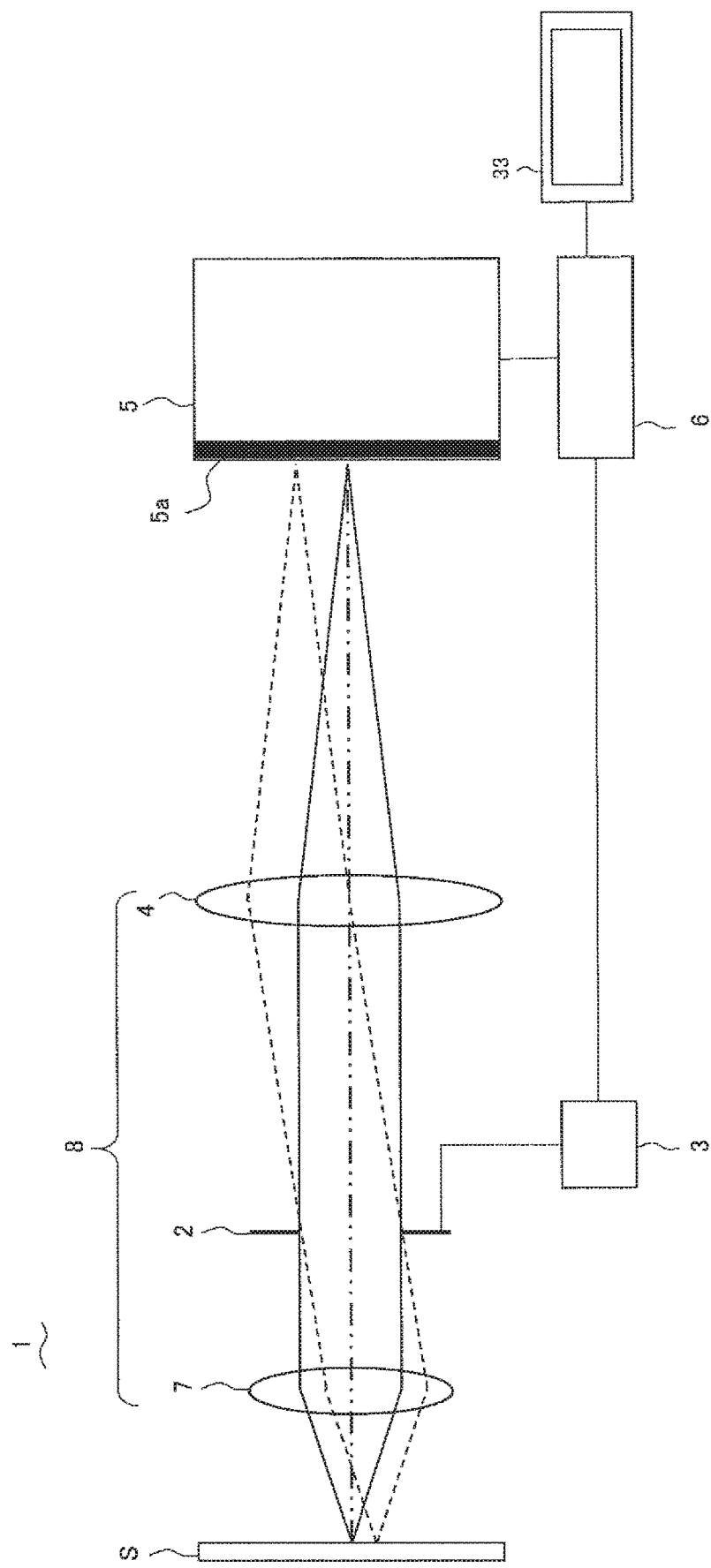
FIG. 1 illustrates a configuration of an observation device according to the first embodiment.

The method in which the observation scope is changed by changing part of the optical system typically can easily change the observation scope by a large margin while maintaining necessary and sufficient observation image performance; however it requires the mechanical driving of a lens group, which is often bulky and heavy. It is necessary to provide a mechanism to realize the mechanical driving. Therefore, it is difficult to fundamentally reduce the size and weight of the apparatus as a whole. In addition, it is difficult to speed up the switching of the optical system and to make the operation silent.

Electronic scaling in which the observation scope is changed by extracting part of image information is advantageous in reducing the size and weight and in achieving a higher speed and silence of the switching because it does not require a mechanical driving unit; however the margin by which the observation scope can be changed while maintaining necessary and sufficient observation image performance will be very small if sufficient consideration is not given to the compatibility with the optical system and the detection unit that are used.

In view of the above problems, it is a main object of the embodiments to provide a compact and lightweight observation device that can perform observation and image pickup with high-speed and silent switching and that can change the observation scope by a relatively large margin while maintaining necessary and sufficient observation image performance.

Hereinafter, explanations will be given for an observation device according to the first embodiment of the present invention by referring to the drawings. Note that the fundamental configuration that represents the features of the present invention is mainly explained in the first embodiment, and more specific examples including the configuration explained in the first embodiment will be explained in other embodiments, which will be described later.

FIG. 1 illustrates a configuration of an observation device 1 according to the first embodiment. The observation device 1 includes an objective 7 and a tube lens 4 that constitute an imaging optical system 8 for forming an image on the basis of light from sample S, which is the object. The observation device 1 further includes an aperture diaphragm 2 included in the imaging optical system 8, a driving unit 3, a camera 5 that converts the formed image of sample S into an image signal to detect the signal, a control PC 6, that is a computer including at least a processor and a memory, for performing various types of control, and a monitor 33 that is a display unit for displaying the image signal in the form of image. Note that the observation device 1 may include a printer etc. as the display unit. In the imaging optical system 8, the objective 7 and the tube lens 4 constitute an afocal optical system between them.

The aperture diaphragm 2 is a variable aperture diaphragm, arranged at, or near, the exit pupil position of the objective 7, that includes aperture blades etc. The diaphragm diameter of aperture portion in aperture diaphragm 2 can be adjusted by the aperture blades. The aperture diaphragm 2 changes the diaphragm diameter of the aperture portion to change the pupil diameter of the objective 7, and thereby changes the numerical aperture on the entering side of the objective 7 and the numerical aperture on the emission side of the tube lens 4. In other words, the aperture diaphragm 2 functions as a numerical aperture changing unit that changes the diaphragm diameter and thereby changes the numerical aperture of the imaging optical system 8 of the observation device 1.

Unless otherwise noted, when simply referring to "numerical aperture" used herein, the "numerical aperture" does not refer to a numerical aperture as a specification expressing the fundamental performance that the optical system is inherently designed to attain. The "numerical aperture" refers to a numerical aperture that is changed appropriately by the aperture diaphragm etc. arranged on the optical path.

Figure 2:
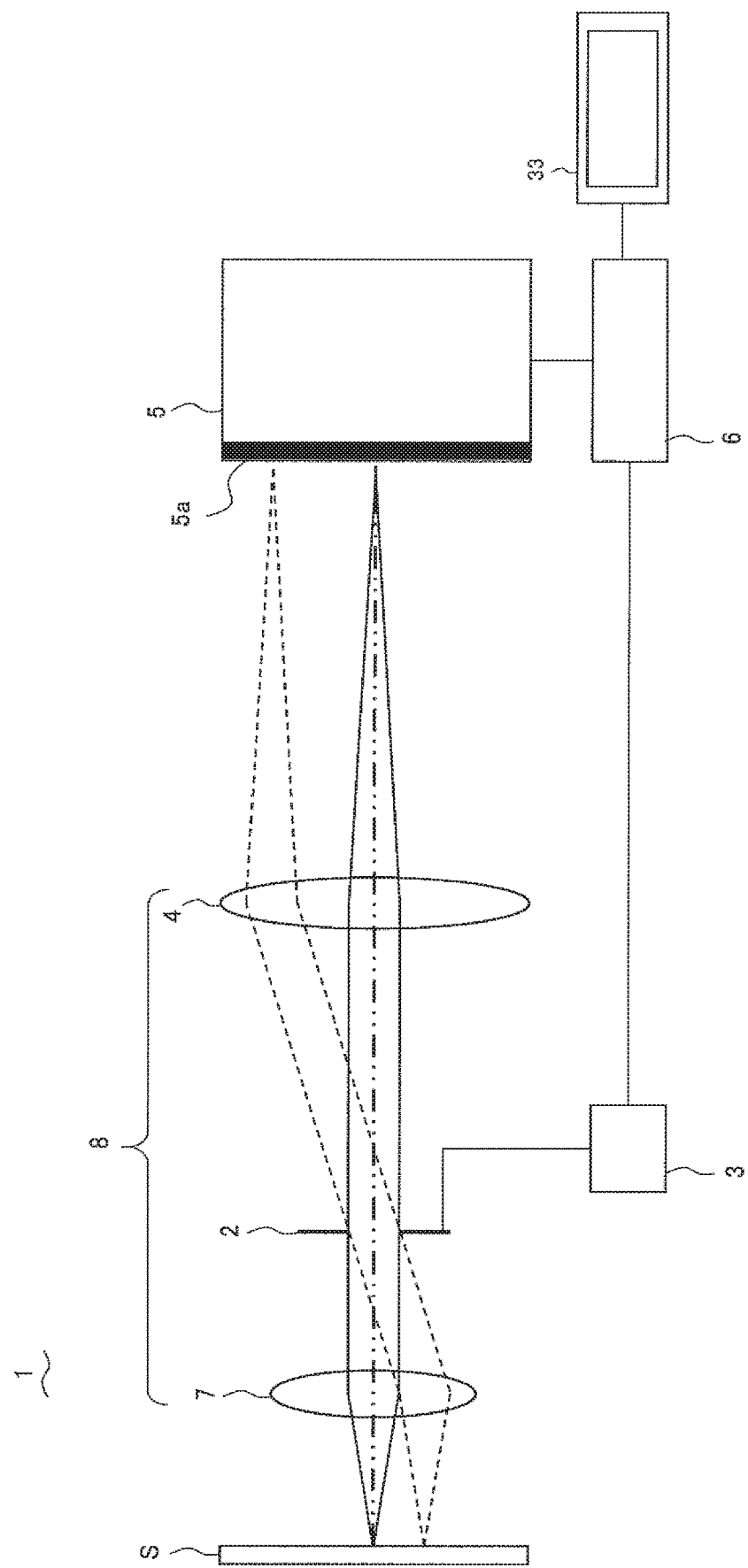
FIG. 2 illustrates the configuration of the observation device according to the first embodiment, the state is different from that in FIG. 1.

FIG. 2 illustrates a state resulting when the aperture diaphragm 2 is narrowed to reduce the diaphragm diameter in the configuration of the observation device 1 of FIG. 1. In this state, the imaging optical system 8 of the observation device 1 has a lower numerical aperture. When the aperture diaphragm 2 is widened, by contrast, the imaging optical system 8 of the observation device 1 has a higher numerical aperture.

The driving unit 3 is a mechanism that mechanically controls the aperture diaphragm 2, and is for example an electric motor. The driving unit 3 operates in accordance with the control performed by the control PC 6.

The camera 5 includes an image pickup element 5a, which serves as a detection unit for converting the image of sample S into an image signal. The image signal obtained through the conversion is displayed on the monitor 33, which serves as a display unit. The camera 5 then serves as an observation scope changing unit that performs an observation scope changing process in which a specific scope of the image signal obtained through the conversion is electronically extracted to change the observation scope. The "observation scope" refers to a scope on sample S displayed when the sample is displayed in the form of image. The "observation scope changing process" refers to the process in which an observation scope is changed, by changing an extraction scope of the image signals, to a scope specified by the user. Then, the monitor 33 displays the image signal obtained from the extraction scope achieved through the observation scope changing process.

By the way, generally, in monochrome image, a state in which the information of the minimum unit obtained from one pixel of the image pickup element 5a used for acquiring an image is displayed by one pixel used for display on the display unit is typically referred to as pixel-to-pixel display. In color image, information on a minimum unit may be generated based on information obtained from a plurality of pixels. Also in this case, the state in which the information of the minimum unit is displayed by one pixel used for display on the display unit is referred to as pixel-to-pixel display. The pixel-to-pixel display is a display state in which the resolution of the image pickup element is utilized the most efficiently and precisely. However, current monitors that are commercially available have screen resolution much smaller than the number of the pixels of the image pickup element. The term "screen resolution" is the number of the pixels of the monitor used for display, the total number of dots of printed matter, and the like. Therefore, if pixel-to-pixel display is attempted to fully utilize the resolution of the image pickup element, only a part of the observation range captured by the image pickup element can be displayed on the monitor. In other words, this state is equivalent to a state in which part of the inherent observation scope is displayed in an enlarged manner on the monitor display with the screen resolution. Conversely, if the entire observation scope of which an image was picked up is to be displayed in pixel-to-pixel display, the number of the pixels of the image pickup element is reduced to approximately the same level as the screen resolution (the number of the pixels used for the display) of the monitor etc. In other words, a case where the dimensions (size) of the maximum imaging range on the image pickup element do not change is equivalent to a case where an image pickup element with a larger pixel pitch and a smaller number of the pixels is used. Alternatively, in the case of using an image pickup element in which neither the maximum imaging range size nor the pixel pitch changes and the number of pixels is large, the state in which the number of pixels is substantially reduced may be displayed by performing a coupling process on the image signals of pixels existing in the vicinity, or the state in which some pixels is thinned out may be displayed by performing an omitting process on the image signals of pixels existing in the vicinity. This is also equivalent to the increasing of the pixel pitch of the image pickup element in a pseudo manner, and results in a situation where the numerical aperture that is optically obtained can be decreased to an extent at which resolution is sufficiently possible with the increased pixel pitch when displaying a large field of view. The screen resolution of the display unit may be changed appropriately in accordance with the observation purposes.

A color image pickup element may be used as the image pickup element 5a or a monochrome image pickup element may be used as the image pickup element 5a. When the image pickup element is a monochrome image pickup element, it can be used as it is for observations with high resolution and high sensitivity or can be used together with a color filter for observations that emphasize the color reproducibility.

The control PC 6 controls a process of changing the numerical aperture performed by the aperture diaphragm 2 and an observation scope changing process of the camera 5. Specifically, the control PC 6 functions as a control unit that controls the aperture diaphragm 2 through the driving unit 3 in response to the observation scope changing process performed in the camera 5. Hereinafter, by referring to FIG. 3, more detailed explanations will be given for the control performed by the control PC 6.

Figure 3:
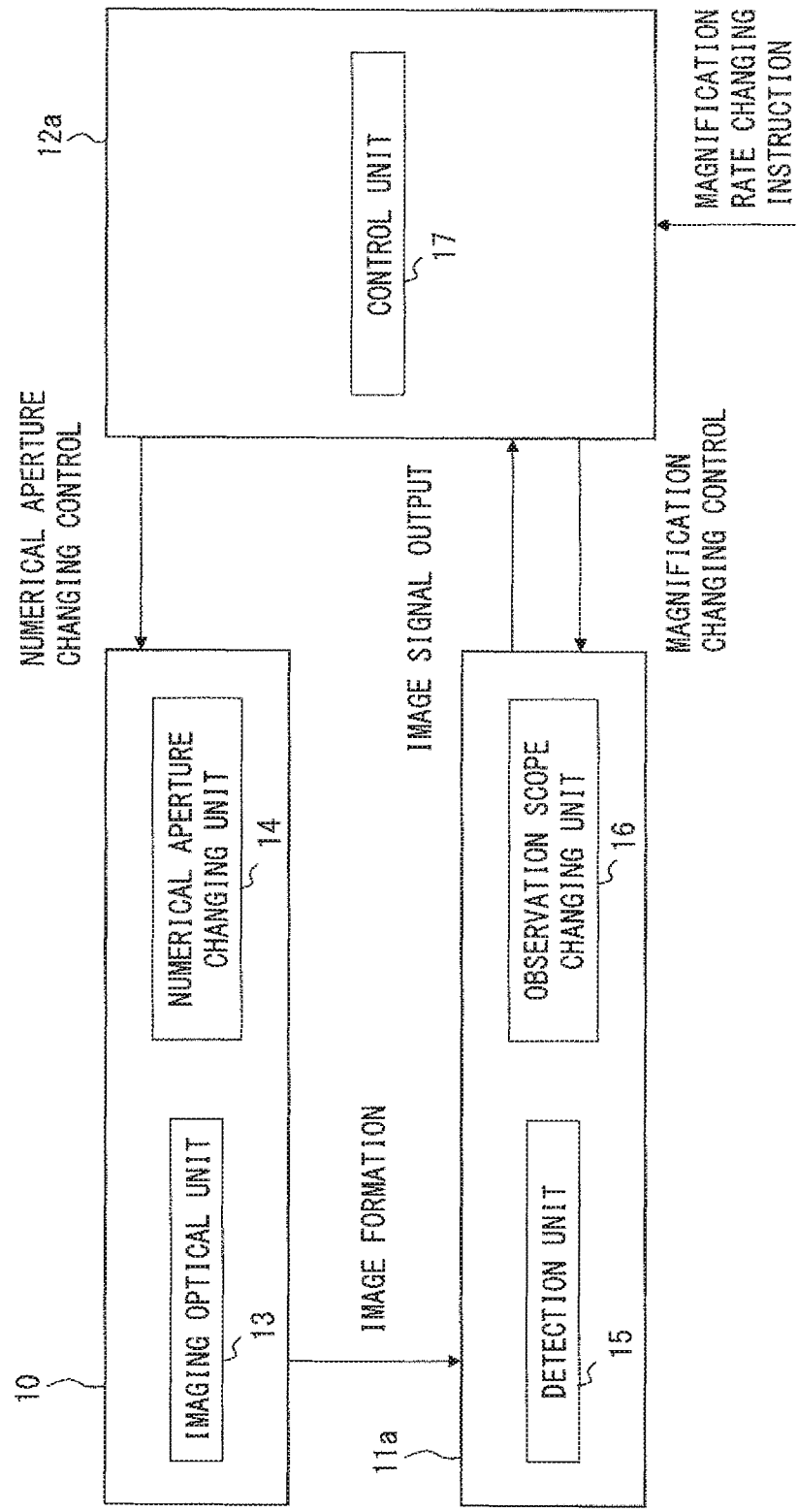
FIG. 3 illustrates an example of a functional configuration of the observation device according to the first embodiment.

FIG. 3 illustrates a functional configuration in which the elements of the observation device 1 are categorized by function. The elements of the observation device 1 can be categorized, by function, into an imaging optical unit 13 and a numerical aperture changing unit 14 that are included in an observation device body 10, a detection unit 15 and an observation scope changing unit 16 that are included in a camera 11a, and a control unit 17 that is included in a control PC 12a. The camera 11a is equivalent to the camera 5 illustrated in FIG. 1, the control PC 12a is equivalent to the control PC 6 illustrated in FIG. 1, and the observation device body 10 is equivalent to the other constituents included in the observation device 1 illustrated in FIG. 1.

The imaging optical unit 13 forms the image of sample S in the detection unit 15. The detection unit 15 converts the formed image into an image signal. The image signal is output for example from the camera 11a to the control PC 12a, and is displayed on the monitor 33 in the form of image, the monitor 33 being connected to the control PC 12a. Thereby, the user of the observation device 1 can observe sample S.

The user can change the observation scope within a prescribed range while looking at the image displayed on the monitor 33. When receiving an instruction to change the observation scope from the user, the control unit 17 controls the observation scope changing unit 16 and thereby performs an observation scope changing process (electronic scaling process) on the image signal in such a manner that the specified observation scope is achieved. The observation scope can be freely set to an arbitrary scope from maximum observation scope I to minimum observation scope II. The maximum observation scope I is an observation scope on the object plane defined by the image pickup element with the maximum dimensions to be used and the projection magnification of the imaging optical system. The minimum observation scope II is an observation scope on the object plane where the area is on the image pickup element with the minimum pixel pitch to be used, the area is the same pixel number area as the screen resolution of the monitor, which is extracted at the pixel-to-pixel display and which is projected by the imaging optical system (i.e. back-projected). Changing the observation scope in the range between observation scope I and observation scope II will hereinafter be referred to as electronic scaling. Also, the ratio between the length of a diagonal of observation scope I and the length of a diagonal of observation scope II will hereinafter be referred to as an electronic scaling ratio. Thus, when an observation is to be performed with high screen resolution with observation scope I remaining unchanged, observation scope II becomes larger, resulting in a lower electronic scaling ratio. When by contrast low screen resolution is sufficient, the electronic scaling ratio can be increased. Note that when observation scope I is defined by scaling 1× in scaling notation, an observation scope may be specified by defining the reciprocal of ratio of the observation range to the observation range I as magnification rate (hereinafter also referred to as electronic scaling magnification rate) and using it. The control unit 17 controls the numerical aperture changing unit 14 in accordance with the observation scope specified in the changing instruction, and thereby changes the numerical aperture of the imaging optical system 8. Also, the control unit 17 controls the numerical aperture changing unit 14 so that the image signal of the specified observation scope has an optical resolution that the image pickup element needs for displaying that image signal on the monitor 33. Specifically, the numerical aperture changing unit 14 changes the numerical aperture so that the image signal has necessary and appropriate optical resolution in accordance with the specified observation scope and the screen resolution of the monitor 33 that displays the image signal of that specified observation scope. Hereinafter, explanations will be given for the control performed by the control unit 17 on the numerical aperture changing unit 14.

In an example of the control performed by the control unit 17, the control unit 17 controls the numerical aperture changing unit 14 in such a manner that the narrower the observation scope specified by the user is, the higher the numerical aperture is on the emission side of the imaging optical unit 13. The control unit 17 also controls the numerical aperture changing unit 14 in such a manner that the wider the specified observation scope is, the lower the numerical aperture is on the emission side of the imaging optical unit 13. When the electronic scaling magnification rate increases, the numerical aperture of the imaging optical unit 13 is controlled to become larger as the instructed observation range becomes narrower. Thereby, the optical resolving power matching the screen resolution can be secured. It is also possible to suppress the blurring of an image that is displayed on the monitor 33 or, preferably, to prevent it even when the monitor 33 enters an enlarged observation state in which the pixel-to-pixel display is performed in observation scope II. Also, when the electronic scaling magnification rate decreases, the numerical aperture of the imaging optical unit 13 is controlled to become smaller as the instructed observation range becomes wider. Thereby, it is easy to correct the aberration of the imaging optical system 8 in a wide field of view, and as a result it can contribute to size reduction, weight reduction and cost reduction. It is also possible to reduce the decrease in the amount of the surrounding light by reducing the difference in numerical aperture between the on-axis flux and the off-axis flux without increasing the effective diameter of the imaging optical system. This can also achieve a further reduction in the size, weight and cost of the entire device and can also reduce uneven brightness occurring in images.

It is more desirable that the numerical aperture of the imaging optical system 8 be changed by the numerical aperture changing unit 14 in such a manner that expression (1) below is satisfied. When the expression below is not satisfied, the optical resolving power is dominant over the resolution of the image pickup element 5a and the optical resolving power is not sufficiently reflected on the image.

$$2 \leq 1.22 \times \lambda / (NAI1 \times P) \tag{1}$$

In the expression, NAI1 is the numerical aperture of the imaging optical system 8, P is the pixel pitch of the image pickup element 5a that is selected in accordance with the specified observation scope when there are one or more cameras 5 or the image pickup elements 5a, and λ is the observation wavelength. For example, the longest observation wavelength that the image pickup element 5a can detect may be used as the observation wavelength.

Note that a case where there are a plurality of cameras 5 or image pickup elements 5a will be described in detail by the third embodiment or a variation example, which will be described later.

Expression (1) expresses a relationship between the numerical aperture of the imaging optical system 8 that is defined by the aperture diaphragm 2 and the pixel pitch of the image pickup element 5a, the image pickup element 5a being selected in accordance with the specified observation scope when there are one or more cameras 5 or image pickup elements 5a. When expression (1) is satisfied in an observation scope that is arbitrarily specified between observation scope I and observation scope II, the information of the image that is formed by the imaging optical system 8 having the numerical aperture of NAI1 can be observed while avoiding at least the decrease in the resolution due to an insufficient number of the pixels even in pixel-to-pixel display in the image pickup element 5a that is used for observing that specified observation scope. Meanwhile, when expression (1) is not satisfied, the image pickup element 5a will have lower resolution due to an insufficient number of the pixels in pixel-to-pixel display, and the optical resolving power of the imaging optical system cannot be fully utilized.

According to the observation device 1 having the above configuration, the aperture diaphragm 2 is controlled in accordance with the observation scope changing process of the camera 5 and thereby an observation scope changing process can be performed while maintaining necessary and sufficient observation image performance at a prescribed electronic scaling magnification rate.

Note that the observation device 1 of the present embodiment does not have a configuration, such as that of a zooming lens, of changing the magnification (optical magnification) at which the image of sample S is projected onto the image pickup element 5a during an observation. In such a configuration, the imaging optical system is a single-focus imaging optical system, which does not require a configuration of controlling the lens to change the magnification, and thus can change the observation scope at a high speed and in silence.

Further, by controlling the numerical aperture changing unit 14 in such a manner that the numerical aperture is intentionally made lower than the above numerical aperture necessary for an observation, an observation of a sample that emphasizes deeper focal depth more than optical resolving power can also be performed. As described above, by variously controlling the numerical aperture changing unit 14 as well, an observation appropriate to the purpose of the user of the observation device 1 can be performed.

Also, the observation magnification rate changes due to a change in the observation scope (electronic scaling process) in the observation device 1, eliminating the necessity to provide a plurality of objectives having different observation magnification rates. This eliminates the necessity for a mechanism such as a revolver having a plurality of objectives, achieving a reduction in the size and weight of the entire device. This also prevents a situation in which the user loses sight of the position of the sample when manipulating the revolver to switch between the objectives, and thereby more comfortable observation is realized. Further, when a liquid immersion objective is used, it is difficult to switch between objectives during an observation, particularly through the manipulation of the revolver, and the configuration not having such a manipulation can be considered to greatly contribute to the improvement in the operability for the user.

Also, the imaging optical system 8 constitutes an afocal optical system in the observation device 1, making it easier to switch between the objectives 7 and between tube lenses 4 independently and to change the dimensions between the units (the objective 7 and tube lens 4). Alternatively, device layouts can be designed more freely and the functions can be expanded more freely, an example of which is that an optical element having a function is arranged in the afocal optical system portion.

Figure 4:
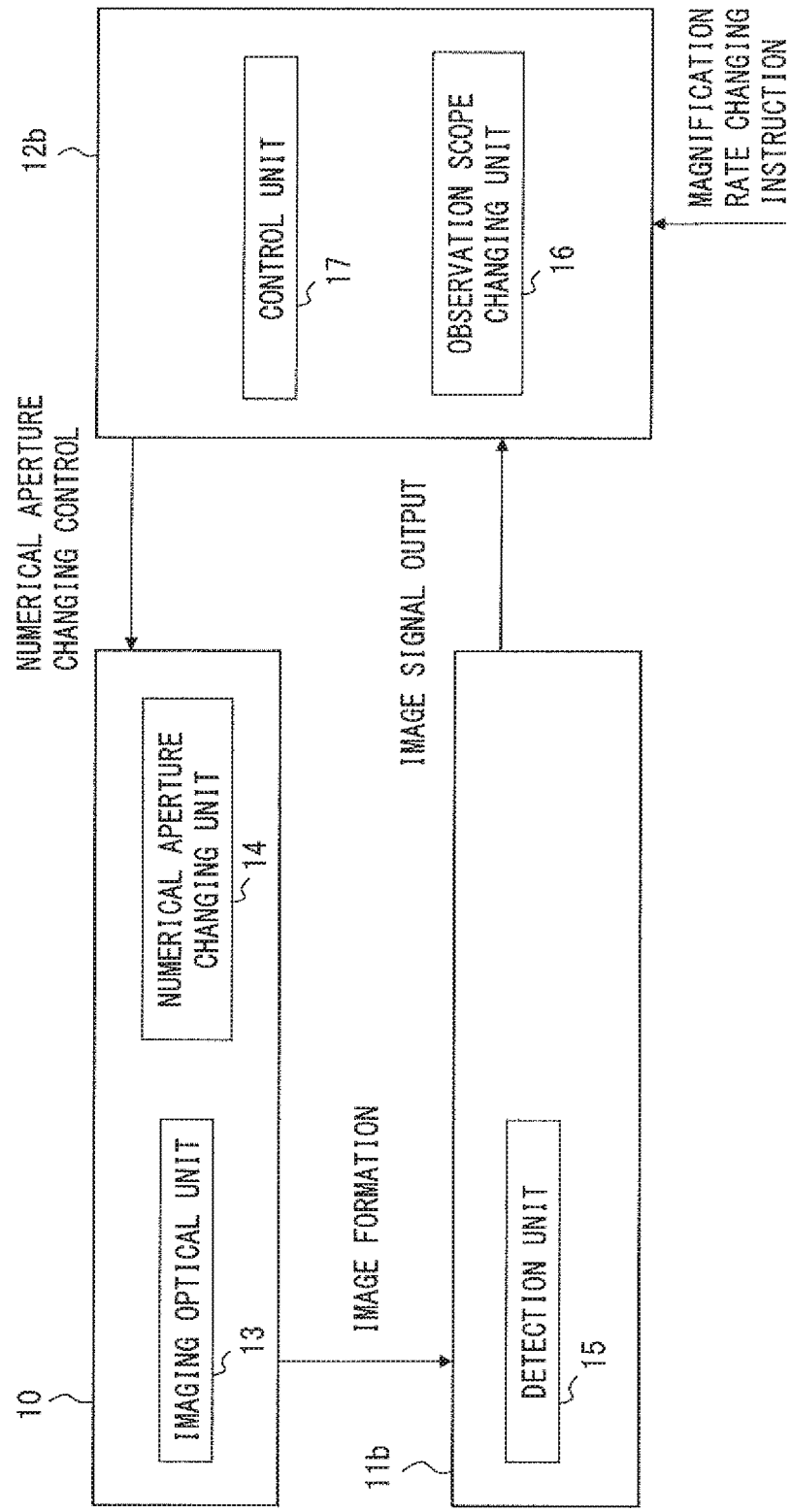
FIG. 4 illustrates another example of the functional configuration of the observation device according to the first embodiment.

Also, the observation device 1 according to the present embodiment may employ the functional configuration illustrated in FIG. 4 instead of the functional configuration illustrated in FIG. 3. A camera 11b illustrated in FIG. 4 is different from the camera 11a illustrated in FIG. 3 in that the camera 11b does not have the observation scope changing unit 16. Also, a control PC 12b is different from the control PC 12a in that the control PC 12b includes the observation scope changing unit 16 in addition to the control unit 17. In this functional configuration, because the camera 11b does not perform an observation scope changing process, the observation scope changing unit 16 included in the control PC 12b performs an observation scope changing process when the camera 11b outputs an image signal to the control PC 12b. An observation device that performs an observation scope changing process while maintaining necessary and sufficient observation image performance can be achieved by having the aperture diaphragm 2 controlled by the numerical aperture changing unit 14 in accordance with the observation scope changing process even when the observation device has a functional configuration such as the above configuration.

Figure 5:
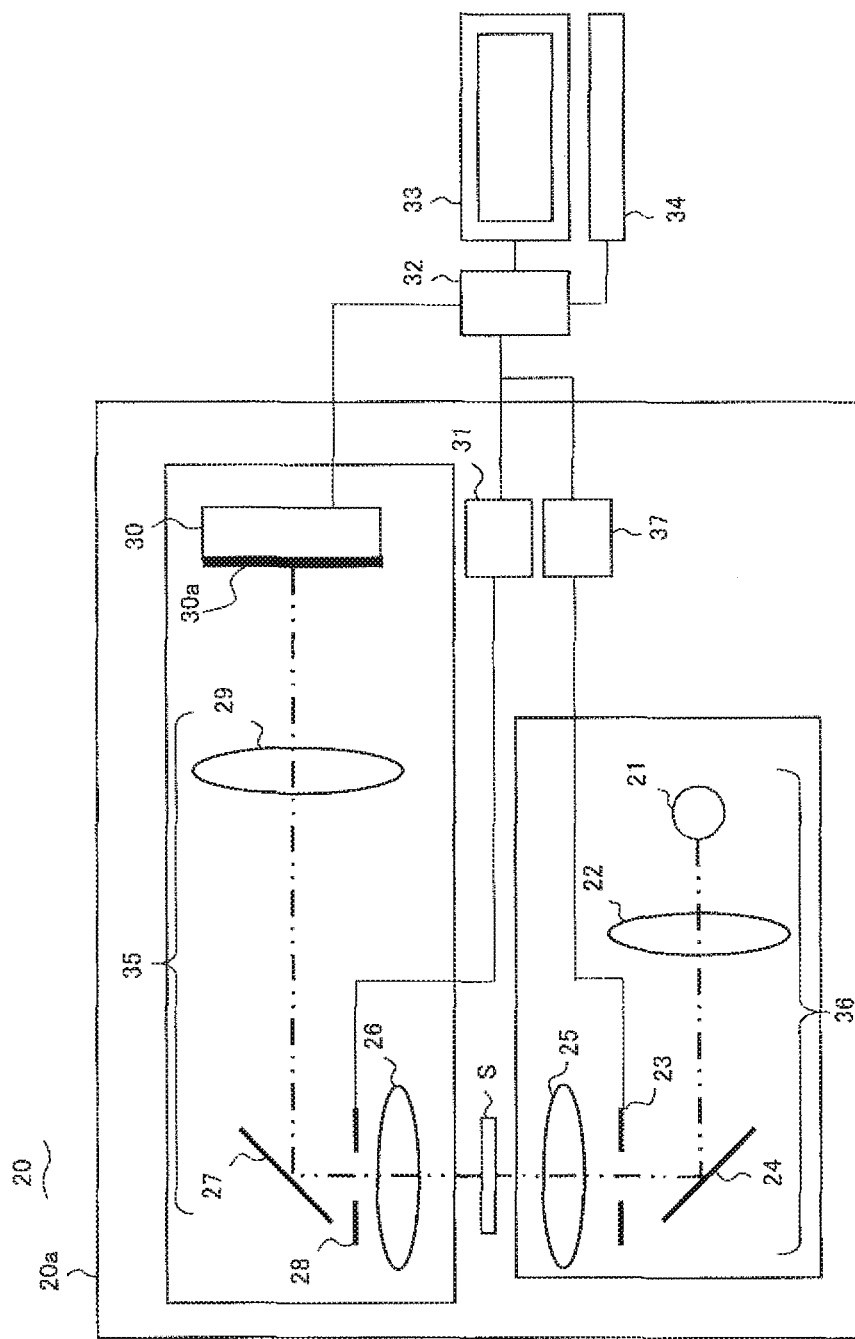
FIG. 5 illustrates a configuration of a microscope according to the second embodiment.

Hereinafter, explanations will be given for an observation device according to the second embodiment by referring to the drawings. FIG. 5 illustrates an observation device 20, which is the observation device according to the second embodiment. The observation device 20 includes a microscope 20a, a control PC 32, the monitor 33, and an input unit 34.

The microscope 20a is a microscope that illuminates sample S by transmitted illumination. The microscope 20a includes a light source 21, a collector lens 22, a mirror 24, and a condenser lens 25, which constitute an illumination optical system 36 that irradiates sample S with the light. The microscope 20a also includes an objective 26, a mirror 27, and a tube lens 29, which constitute an imaging optical system 35 that forms an image on the basis of the light from sample S. The microscope 20a further includes an aperture stop 23 included in the illumination optical system 36, an aperture diaphragm 28 included in the imaging optical system 35, a camera 30, and driving units 31 and 37. Various types of lenses including not only a glass spherical lens, but also a plastic lens, an aspherical lens, a diffractive optical element, a refractive-index distribution lens, a focus tunable lens, etc. can be used for the optical system.

Figure 6:
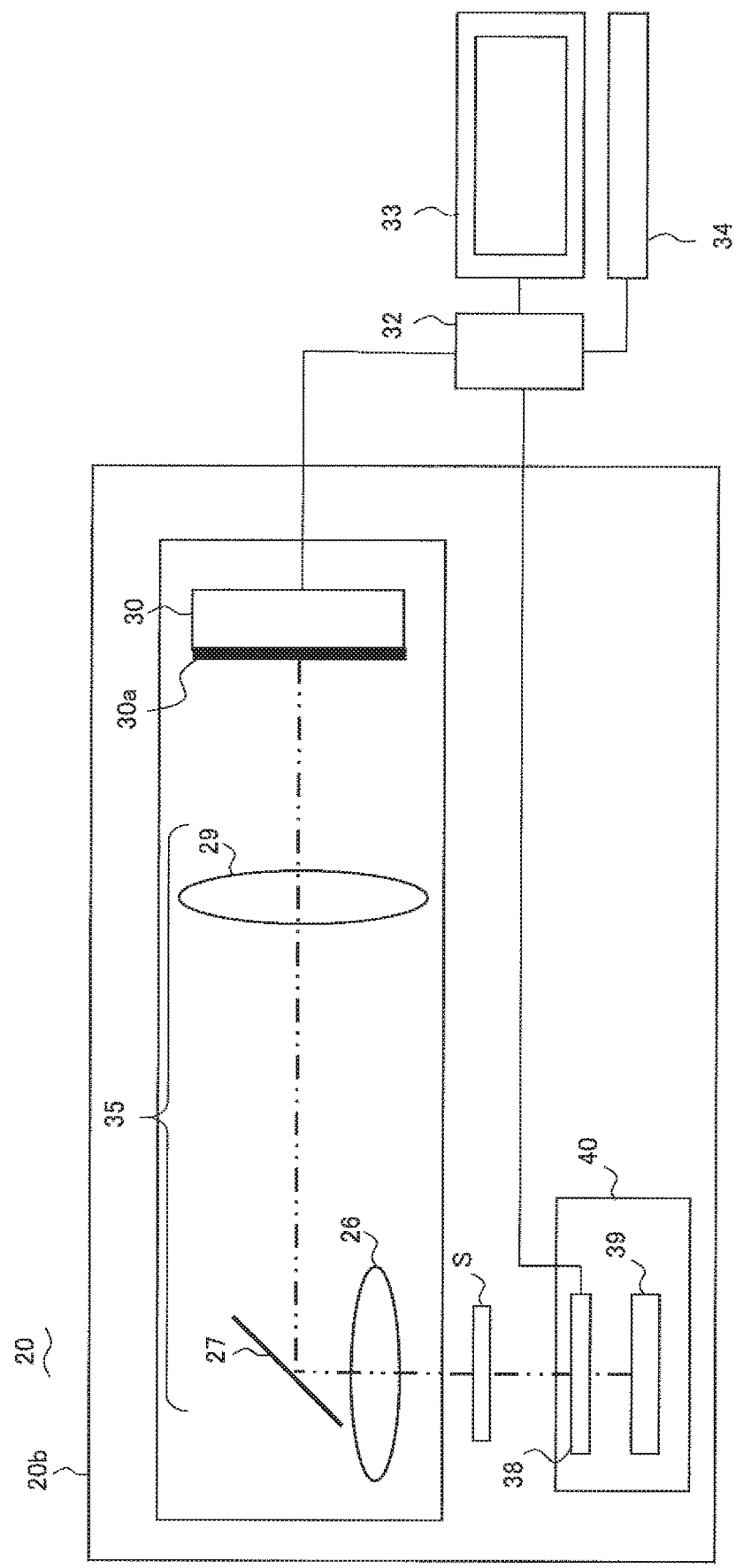
FIG. 6 illustrates another configuration of the microscope according to the second embodiment.
Figure 7:
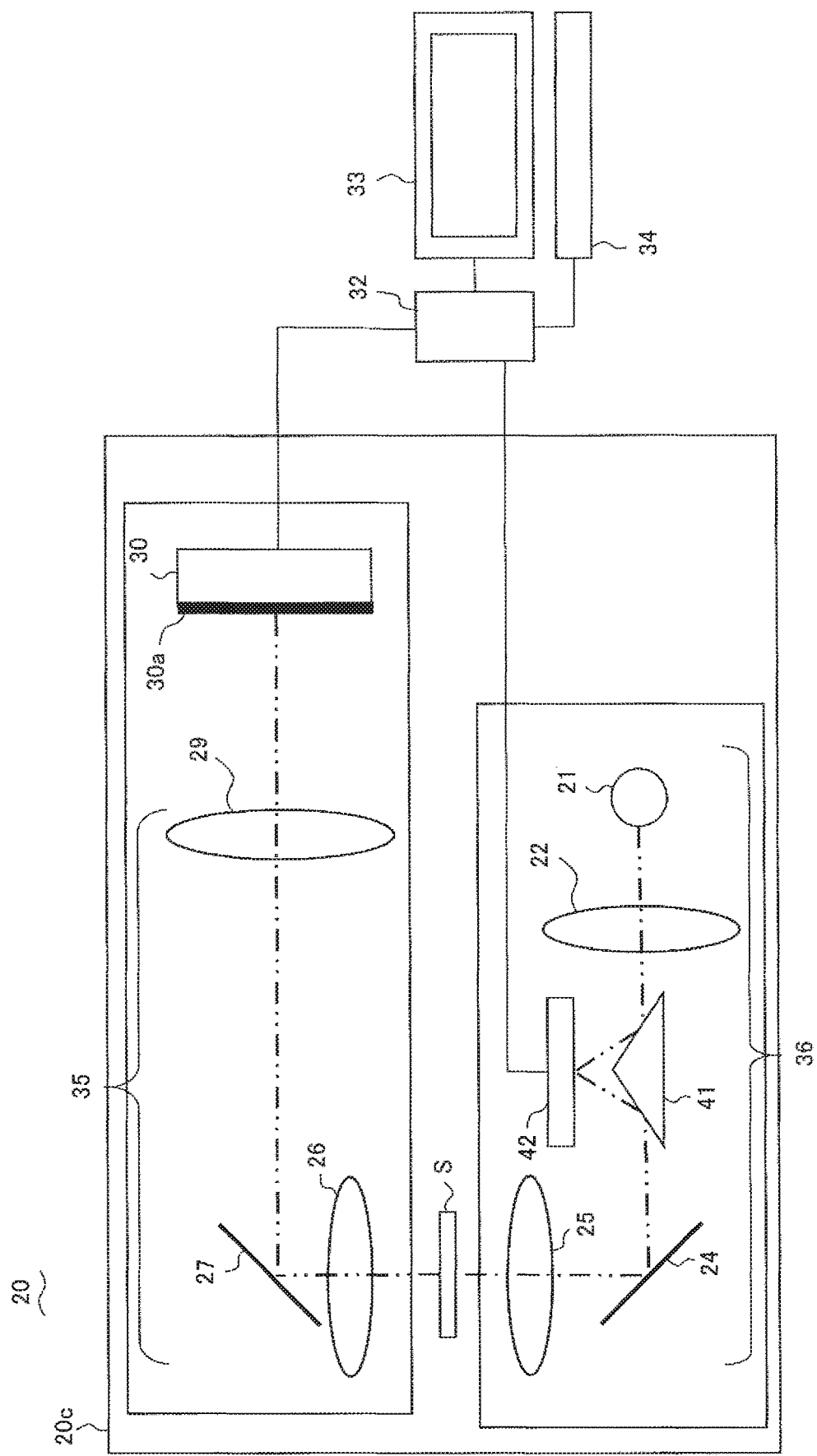
FIG. 7 illustrates still another configuration of the microscope according to the second embodiment.

The aperture stop 23 is a numerical aperture changing unit of the illumination optical system 36 that operates similarly to the aperture diaphragm 2 of the first embodiment. In this configuration, by changing the aperture stop diameter of the aperture stop 23 to change the numerical aperture for the illumination light entering the imaging optical system 35 of the microscope 20a, the substantial numerical aperture of the imaging optical system 35 can also be changed. Note that not only the aperture stop 23 but also any element that can change the substantial numerical aperture of the imaging optical system 35 can be used as the numerical aperture changing unit. For example, the microscope 20b included in the observation device 20 may employ, instead of the illumination optical system 36 illustrated in FIG. 5, the configuration of the illumination optical system 40 including a surface-emission light source 39 using an LED, an organic EL element, etc. and a diffusion angle variable element 38 as illustrated in FIG. 6. The diffusion angle variable element 38 is a commercially available optical element that can emit light at a diffusion level different from the diffusion level of the entering light, and can be provided with a function equivalent to the changing of the numerical aperture of the illumination optical system 40 by being arranged between the surface-emission light source 39 and sample S. The diffusion angle variable element 38 is electrically controlled by the control PC 32. Note that the illumination optical system 40 can be in a thin shape having a small dimension in the optical axis directions by arranging the surface-emission light source 39, the diffusion angle variable element 38, and sample S as close to each other as possible. It is also possible to provide a space-saving device in which the height of the entire observation device 20 is suppressed. Also, the microscope 20c included in the observation device 20 may employ a configuration including a prism 41, an optical path for the light reflected from the prism 41, and a digital mirror device (DMD) 42 that is arranged at, or near, a position conjugate with the exit pupil position of the objective 26 on that optical path as illustrated in FIG. 7. In other words, the numerical aperture changing unit is not limited to a member that mechanically changes the numerical aperture but may be a member that electrically changes the numerical aperture such as a diaphragm that uses a liquid crystal, etc.

The maximum numerical aperture of the entire optical system, which is defined by the lowest numerical aperture from among the numerical aperture of the illumination optical system 36 or 40 and the numerical aperture of the imaging optical system defined by the aperture diaphragm 28 included in the imaging optical system 35, is set to satisfy expression (2) below.

$$2 \leq 1.22 \times \lambda/(NAI2 \times P) \quad (2)$$

In the expression, NAI2 is the maximum numerical aperture of the entire optical system including the illumination optical system and the imaging optical system, P is the pixel pitch of the image pickup element 5a that is selected in accordance with the specified observation scope when there are one or more cameras 5 or the image pickup elements 5a, and λ is the observation wavelength. For example, the longest observation wavelength that the image pickup element 5a can detect may be used as the observation wavelength.

Note that a case where there are a plurality of cameras 5 or image pickup elements 5a will be described in detail in the third embodiment or a variation example, which will be described later.

By controlling numerical aperture NAI2 in accordance with the observation scope changing process of the camera 30 also in the observation device 20 satisfying expression (2) that is applied to the entire optical system including the illumination optical system as well, an observation scope changing process can be performed while maintaining observation image performance that is necessary and sufficient for a prescribed electronic scaling magnification rate that is defined by a balance between the screen resolution of the monitor 33 and the optical resolving power of the observation device 20.

Also, by performing control in which the numerical aperture is intentionally made lower than a numerical aperture necessary for the observation, an observation of a sample can be performed while giving higher priority to the emphasis of contrast than an optical resolving power. In such a case, a satisfactory observation is possible even when for example sample S is a transparent object etc. As described above, by variously controlling the maximum numerical aperture of the entire optical system and the place in which that value is determined, an observation appropriate to the purpose of the user of the observation device 20 can be performed.

The driving unit 31 and the driving unit 37 illustrated in FIG. 5 are respectively a mechanism that mechanically controls the aperture diaphragm 28 and a mechanism that mechanically control the aperture stop 23, and are for example electric motors. The driving units 31 and 37 operate in accordance with the control performed by the control PC 32.

The camera 30 includes an image pickup element 30a for converting the image of sample S into an image signal. The camera 30 also functions as an observation scope changing unit that performs an observation scope changing process of changing the observation scope of the image signal obtained through the conversion. The camera 30 performs the observation scope changing process in accordance with the control performed by the control PC 32.

The control PC 32 is a computer that controls a process of changing the numerical aperture performed by the aperture stop 23 and an observation scope changing process performed by the camera 30.

The observation device 20 has a functional configuration similar to that illustrated in FIG. 3, the camera 30 illustrated in FIG. 5 is equivalent to the camera 11a, the control PC 32 illustrated in FIG. 5 is equivalent to the control PC 12a, and the configuration of the microscope 20a illustrated in FIG. 5 is equivalent to the observation device body 10. Specifically, the control PC 32 performs control similar to that performed by the control PC 6 of the first embodiment, and thereby functions as a control unit that controls the aperture stop 23 through the driving unit 37 and that controls the aperture stop 23 through the driving unit 37 in accordance with an observation scope changing process of changing the observation scope on the basis of the image signal obtained by the image pickup element 30a.

The input unit 34 has a function that allows the user of the observation device 20 to input, to the control PC 32, an instruction to change the observation scope, and examples of the input unit 34 may include a keyboard, a mouse, etc.

The monitor 33 is a display device that is connected to the control PC 32 and that displays, in the form of image, the image signal obtained through the conversion performed by the camera 30. The user observes and photographs sample S while watching the image displayed on the monitor 33 and also gives an instruction to change the observation scope.

Also, sample S is fixed on for example the stage (not illustrated), and the observation position of sample S changes appropriately when the stage is driven. The control PC 32 may automatically control the driving of the stage or the user of the observation device 20 may manually control the stage by turning the dial and the other things.

Figure 8:
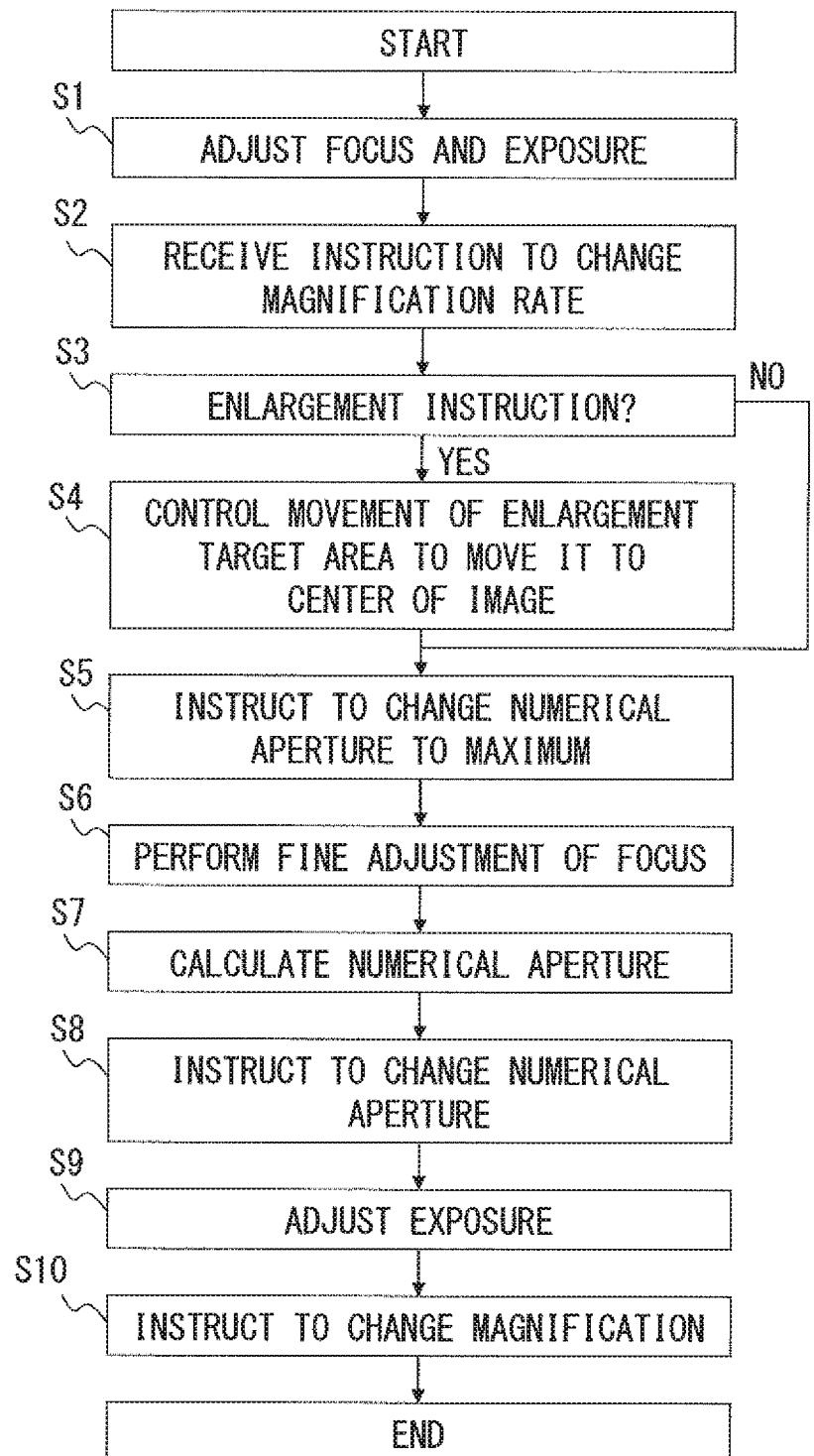
FIG. 8 is a flowchart illustrating the procedures of controlling the numerical aperture performed by a control PC.

The user uses the observation device 20 having the above configuration to observe or photograph sample S through the image displayed on the monitor 33. FIG. 8 is a flowchart illustrating the procedures of controlling the numerical aperture performed by the control PC 32 accompanying a change in the observation scope (change in the electronic scaling magnification rate). Hereinafter, by referring to FIG. 8, explanations will be given for the procedures of controlling the numerical aperture performed by the control PC 32. The process of this flowchart starts with sample S fixed on the stage by the user in advance.

In step S1, control is performed to adjust the focus and the exposure of the image of sample S displayed for the user. The focus is adjusted by controlling the movement of the stage, which serves as a sample holding unit, in the optical axis directions in such a manner that the image comes into focus. The exposure is controlled by changing the settings of the exposure time etc. The focus is adjusted by using various methods including a contrast method in which the focus is adjusted on the basis of a change in the contrast of the image and an image plane phase-difference detection method in which the focus is adjusted by using a phase-difference detection pixel included in the image pickup element.

In step S2, the control PC 32 receives an instruction to change the electronic scaling magnification rate. The instruction to change the electronic scaling magnification rate may be directly indicate an arbitrary electronic scaling magnification rate. Upon the reception, the user is observing sample S while watching the image of step S1, and uses the input unit 34 to input, to the control PC 32, an instruction to change the electronic scaling magnification rate. When an instruction to change the electronic scaling magnification rate is received, the process proceeds to step S3.

In step S3, it is determined whether the input electronic scaling magnification rate changing instruction is an enlargement instruction. The enlargement instruction is an instruction to change the current observation magnification rate to a higher observation magnification rate by changing the observation scope to an observation scope narrower than the current observation scope. When the input electronic scaling magnification rate changing instruction is an enlargement instruction, the process proceeds to step S4. When the instruction is not an enlargement instruction (i.e. when the instruction is an instruction to change the observation magnification rate to a magnification rate lower than the current observation magnification rate), the process proceeds to step S5.

In step S4, the user specifies an area to be enlarged, and the stage is controlled so that the coordinate position on the stage corresponding to the center position of the specified region coincides with the center position of the image display range of the monitor 33.

In step S5, the aperture stop 23 and the aperture diaphragm 28 is controlled and the exposure is adjusted so that the numerical aperture in the whole optical system becomes maximum before the focus adjustment. In step S6, after step 5 in which the numerical aperture in the whole optical system is changed to the maximum numerical aperture, control is performed to makes the focal depth shallower so that the unfocused state is more noticeable. Thereafter, the control for adjusting the focus more accurately is executed accordingly. Because focal depth in a wide field-of-view observation and focal depth in a high-definition observation (high electronic scaling magnification rate observation) are different, controlling the numerical aperture when changing the observation scope (changing the electronic scaling magnification rate) may make noticeable the unfocused state. Thereby, uncomfortable feeling that the user who wants to change the observation scope with the image remaining in focus may have is to be mitigated. In step S6 as well, various methods including a contrast method and an image plane phase-difference detection method are used for adjusting the focus.

In step S7, the numerical aperture is calculated on the basis of the electronic scaling magnification rate instructed by the input electronic scaling magnification rate changing instruction. The calculated numerical aperture makes it possible to optimize a balance between the screen resolution of the monitor 33 and the optical resolving power of the observation device 20 and maintain observation image performance that is necessary and sufficient, as described in the first embodiment.

In step S8, the numerical aperture is controlled so that the numerical aperture becomes identical to the numerical aperture calculated in step S7. In step S9, the exposure is controlled accompanying the change of the numerical aperture. In step S10, by instructing the camera 30 to change the extraction scope of image signal and the extraction scope, the electronic scaling magnification rate is changed so that the electronic scaling magnification rate becomes identical to the input magnification rate. When the process in step S10 is terminated, the present flowchart is terminated.

Figure 9:
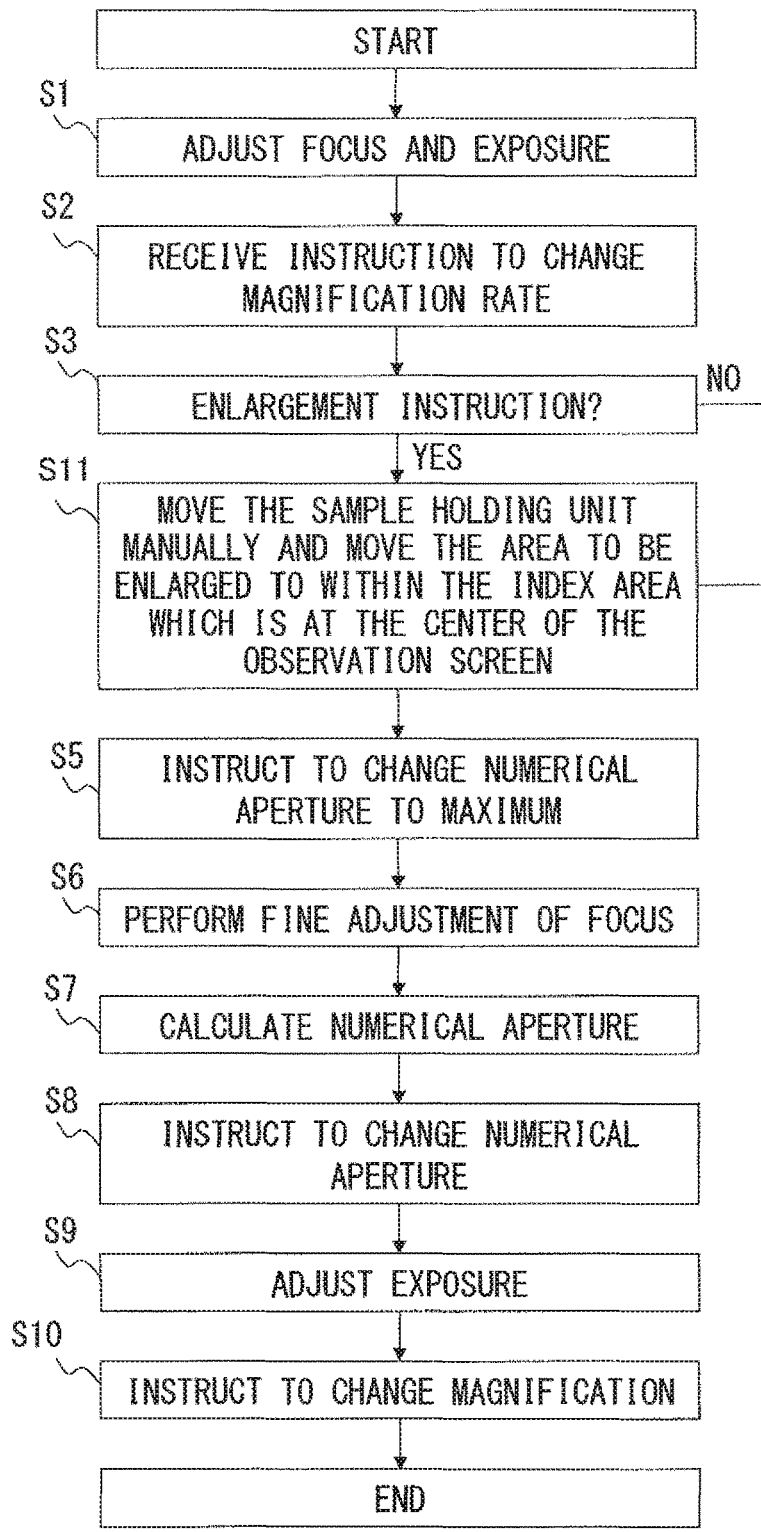
FIG. 9 is a flowchart illustrating the procedures of manually controlling the numerical aperture.

While the present embodiment illustrates an example in which the control PC 32 automatically controls the movement of the stage (sample holding unit) that fixes sample S, the user may manually control the stage. FIG. 9 is a flowchart illustrating the procedures in which the control PC 32 controls the numerical aperture accompanying a change in the observation scope, the flowchart being for a case where the user manually controls the stage. The flowchart illustrated in FIG. 9 includes the same steps as those in the flowchart illustrated in FIG. 8 except step S11, which is performed instead of step S4.

Step S11 in FIG. 9 is a step to which the process proceeds when the magnification rate changing instruction input in step S3 is an enlargement instruction. In step S11, the user manipulates the stage to move the area to be enlarged so as to be located near the center of the display range of the monitor 33, and notifies the control PC 32 of the completion of the movement. By performing similar procedures, an observation scope changing process can be performed while maintaining necessary and sufficient observation image performance even when the movement of the stage is manually controlled.

Also, the numerical aperture changing unit such as the aperture diaphragm etc. controls the numerical aperture in the observation device 20, and accordingly no changes will occur to the lengths of the optical paths of the optical systems or to the lens positions, and a change in the observation scope will not cause a change to the pupil position. This makes it easy to insert and remove a modulation element to and from a position on or near the pupil position. In addition to the above, it is also possible to perform various operations including relaying of the pupil position, projecting of an illumination light source image onto the pupil position, etc., and the configuration may be changed as needed.

The stage for fixing sample S and the various types of optical systems and the image pickup element included in the observation device 20 may include a blurring correction function to respond to environmental vibrations.

While the focus adjustment method in which the stage, serving as a sample holding member, is moved in the optical axis directions is described in step S1 and step S6, the focus adjustment method is not limited to this method. An inner focus method in which the imaging optical system 35 and the camera 30 integratedly move in the optical axis directions or the finite optical system moves only some of the optical systems in the optical axis directions so as to adjust the focus without moving the stage in the optical axis directions may be employed when the imaging optical system 35 is a finite optical system. The above some of the optical systems may include an active optical element such as a focus tunable lens etc. When the imaging optical system 35 is an infinity optical system, the focus may be adjusted by only moving, in the optical axis directions, the objective 26 positioned on the sample side of the parallel flux portion. While the focus may be adjusted manually, it is more desirable that the focus be automatically adjusted in coordination with various types of focus detection units such as those used in step S1 or step S6.

Figure 10:
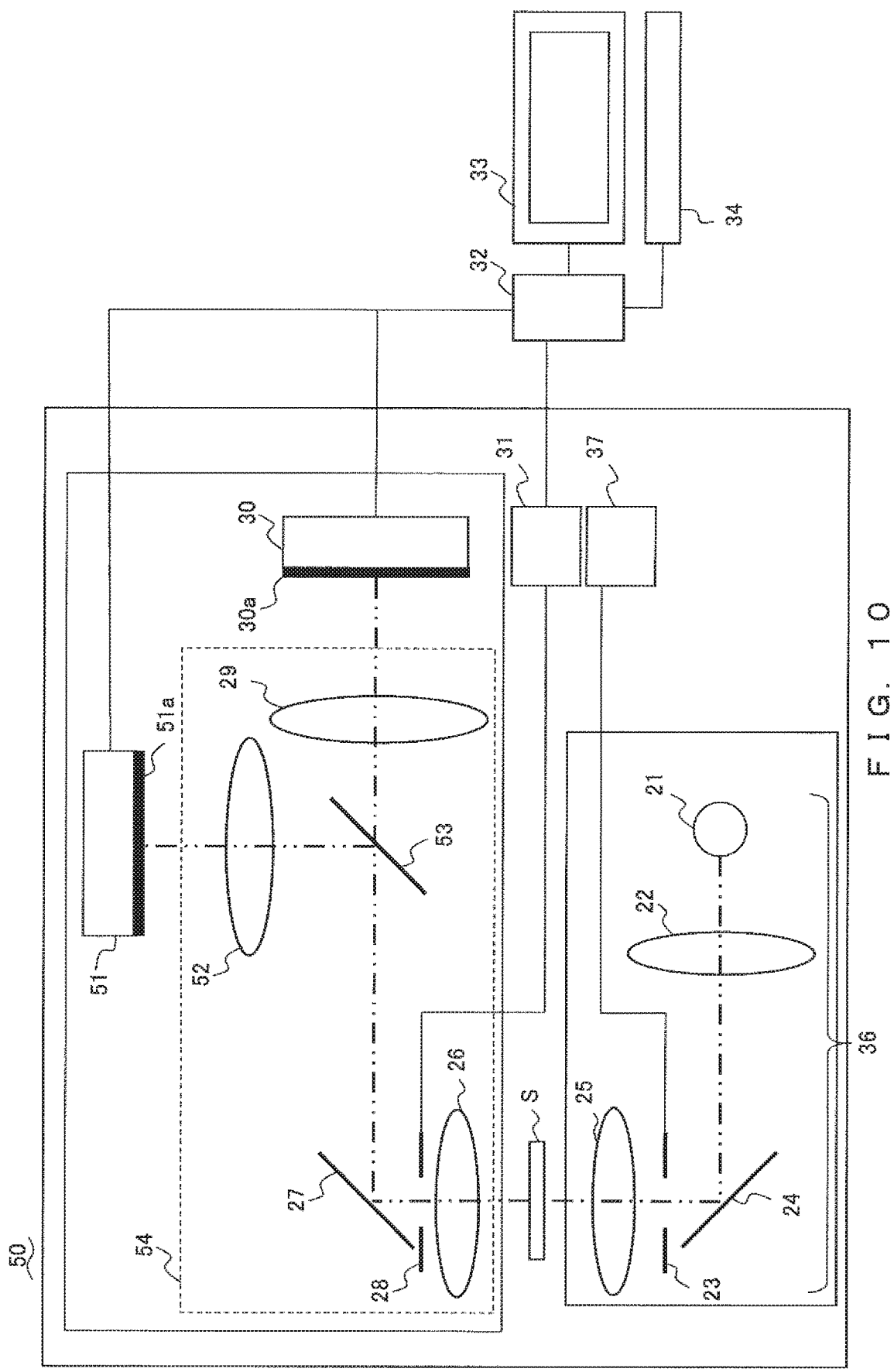
FIG. 10 illustrates a configuration of a microscope according to the third embodiment.

Hereinafter, explanations will be given for the observation device according to the third embodiment by referring to the drawings. FIG. 10 illustrates an observation device 50, which is the observation device according to the third embodiment. The observation device 50 is different from the observation device 20 in that the observation device 50 includes a half mirror 53, a new optical path that is branched by the half mirror 53, and a tube lens 52 on that new optical path and in that the observation device 50 includes a camera 50 on the image position. The half mirror 53, the new optical path, and the tube lens 52 constitute an imaging optical system 54. The observation device 50 is similar to the observation device 20 in other aspects.

A camera 51 includes an image pickup element 51a for converting the image of sample S into an image signal. The image pickup element 51a is an image pickup element having a pixel pitch different from that of the image pickup element 30a included in the camera 30. While the camera 51 is different from the camera 30 in that the camera 51 includes an image pickup element 51a, it has functions similar to those of the camera 30. In other words, the observation device 50 may be considered to be an observation device having a detection unit that includes two image pickup elements.

It is assumed that the image pickup element 30a satisfies the relationship with the screen resolution as described in the explanations of the electronic scaling process in FIG. 3 and satisfies expressions (1) and (2) and thereby electronic scaling is possible between observation scope I-3 and observation scope II-3 while maintaining necessary and sufficient observation image performance, observation scope II-3 being narrower than observation scope I-3. In this example, the maximum observation scope and the minimum observation scope for the image pickup element 30a are respectively referred to as observation scope I-3 and observation scope II-3, and the maximum observation scope and the minimum observation scope for the image pickup element 51a are respectively referred to as observation scope I-5 and II-5. It is assumed in this situation that the maximum observation scope I-5 for the image pickup element 51a is similar to the minimum observation scope II-3 for the image pickup element 30a. In such a case, in the entire observation device 50, an observation scope change (electronic scaling) can be performed from observation scope I-3 to observation scope II-5 by a large margin that the image pickup element 30a alone is not able to achieve while maintaining necessary and sufficient observation image performance. In other words, a higher electronic scaling ratio can be achieved.

While the observation scope changing process (electronic scaling process) may be performed by using discrete values (such as 20 times, 50 times, 100 times, etc.), the observation scope process performed continuously will have a higher degree of freedom in changing the observation scope. For this, observation scope I-5 has to be equal to or greater than observation scope II-3. By keeping high-definition observation (high electronic scaling magnification rate observation) by the electronic scaling up to an observation scope that is identical to observation scope I-5 in the image pickup element 30a or by keeping wide field-of-view observation up to an observation scope that is identical to observation scope II-3 in the image pickup element 51a, no blank scope occurs in the observation scope when the image pickup element 30a is switched to the image pickup element 51a (or vice versa). In other words, the observation scope can be changed from observation scope I-3 to observation scope II-5 in a continuous and finer manner. Also, when the image pickup elements are switched accompanying electronic scaling, by performing photography simultaneously by using the two image pickup elements that are to be switched (the image signal is simultaneously obtained by using the two image pickup element that are to be switched), the present embodiment may implement more natural and continuous electronic scaling process so as to avoid phenomena based on the discontinuousness (such as blackout etc.) that would occur upon switching and may improve the efficiency of searching for the observation site of the specimen S by simultaneously displaying images with different observation scopes.

Also, using the half mirror 53 reduces the amount of light that enters each image pickup element. In order to compensate for the insufficient amount of light, a binning function having the camera may be used to improve the light sensitivity. The light sensitivity may also be increased while cooling the image pickup element and reducing thermal noise, and known methods such as air cooling, electric cooling using a Peltier element etc., a water cooling, etc. can be used as the cooling method.

A configuration may use, instead of the half mirror 53, a mirror or a DMD that mechanically or electrically switches the entrance of light to the image pickup elements 30a and 51a. In such a case, It is desirable for the control PC 32 to controls the switching using the mirror and the DMD in cooperation with the observation scope changing process.

In order to achieve an image of higher resolution, a pixel shift method in which image pickup elements oriented to particular directions somewhat shifted from each other perform photography and thereby the spaces between the pixels are compensated for may be used.

Also, while an example in which the observation device 50 includes two cameras having different pixel pitches of image pickup element has been described, the observation device is not limited to this configuration and any observation device having two or more image pickup elements having different pixel pitches can be used. If the observation apparatus 50 has two or more image pickup elements having the same pixel pitch, the observation apparatus 50 may make the pixel pitch of each image pickup element substantially different by using binning function or the like. In this case, the image pickup element on which performed the binning is suitable for efficiently searching the observation site of the specimen S with high sensitivity and wide field of view.

Figure 11:
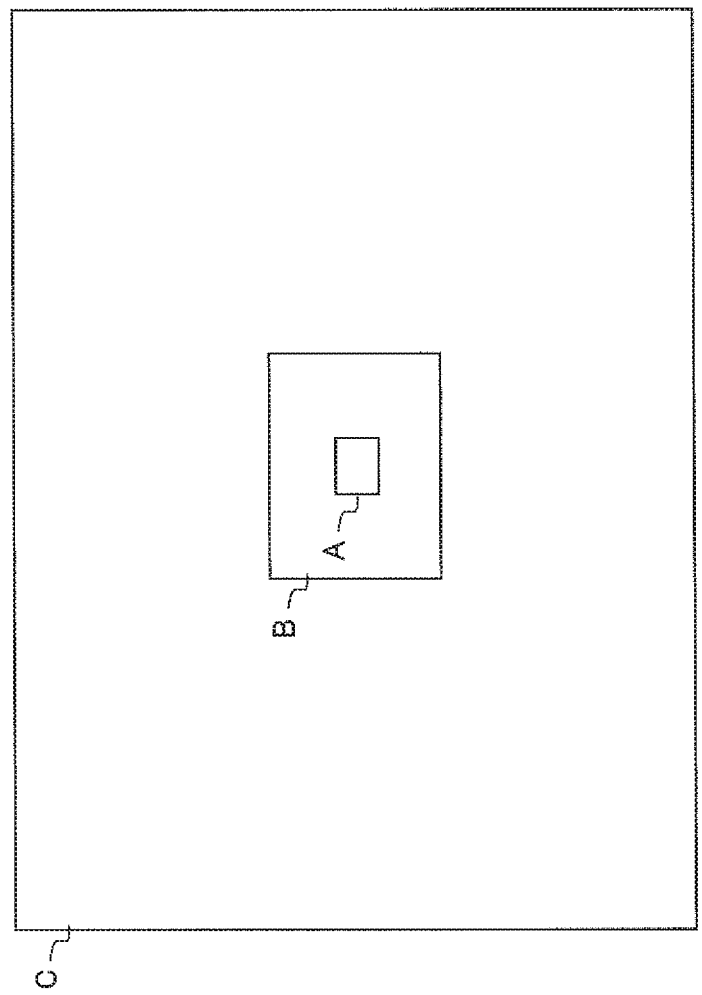
FIG. 11 illustrates an image pickup element according to a variation example according to the third embodiment.

Further, as a variation example of the third embodiment, the observation device may have a configuration in which the image pickup element 55 as illustrated in FIG. 11 is used. The image pickup element 55 is divided into area A, area B, which surrounds area A, and area C, which surrounds area B. Area B has a pixel pitch smaller than that of area C, and area A has a pixel pitch that is smaller than that of area B.

In an observation using the image pickup element 55, pixels to be used in areas A and B are selected (thinned out) or a binning process are executed on the pixels so that areas A and B will have pixel pitches similar to the pixel pitch of area C when for example an observation is performed on a wide area (a low electronic scaling rate observation) that includes the entire scope including areas A through C in FIG. 11. Also, in an observation at a electronic scaling magnification rate that includes areas A and B in FIG. 11, pixels to be used in area A are selected (thinned out) or a binning process are executed on the pixels so that area A will have a pixel pitch similar to that of area B. The pixel pitch of the image pickup device 55 may be the same from the area A to the area C. Even in that case, basically, as long as it has the function of selecting (thinning out) or binning the pixels to be used for each area, it is possible to change the observation scope (electronic scaling) with the electronic scaling ratio while maintaining the necessary and sufficient observation image performance with one imaging element.

Using an image pickup element such as this makes it possible to attain the effects described in the third embodiment by using just one image pickup element if the image pickup area (areas A through C in the above example) selected in accordance with the specified observation scope is used. Further, it is not necessary to provide a plurality of optical paths for providing a plurality of image pickup elements and to switch between the optical paths, making it easy to secure a sufficient amount of light, and thereby the device can easily be more speedy, more silent, smaller and lighter.

The third embodiment may employ a variation configuration in which the aperture stop on the optical path is controlled so as to change the numerical aperture on the emission side of the imaging optical system 54 as in the second embodiment. In such a configuration, the control PC 32 controls the aperture stop 23 in such a manner that expression (2) is satisfied for the observation scope specified by the user.

Note in the above embodiments that the imaging optical system including the numerical aperture changing unit, the illumination optical system, and the detection unit such as the image pickup element etc. can respectively be switched with a different imaging optical system, a different illumination optical system, and a different detection unit such as an image pickup element, etc. In particular, the inventions of the respective embodiments of the present application, which do not have a mechanism for mechanically changing the focal length etc. of the optical system in the optical system, have a configuration in which the switching as described above can be performed easily. Also, each replaceable unit may be provided with a unit that performs communication and power supply of wireless communication elements etc., an information storage unit such as a memory, a unit that performs communication and power supply of an electric contact etc., or other units.

While the above embodiments describe examples of a transmitted illumination microscope, epi-illumination microscope and an oblique illumination microscope may have functions and configurations similar to those described above. Also, for a confocal microscope, the galvanometer mirror serving as the observation scope changing unit changes its oscillation angle and thereby changes the observation scope. The aperture diaphragm is narrowed to a greater extent to obtain an image with a lower magnification at a greater angle of the galvanometer mirror, i.e., to obtain an image of a wider field of view. The aperture diaphragm is widened to a greater extent to obtain an image with a higher magnification at a smaller angle of the galvanometer mirror, i.e., to obtain an image with a smaller field of view but high definition. Thereby similar effects can be achieved.

Also, observations of a sample using the observation devices according to the above embodiments can be applied to various purposes including, live image recording, still image photography, time-lapse observation, etc.

Explanations will be given for the observation device according to the fourth embodiment by referring to the drawings. FIG. 12 illustrates an observation device 60 according to the fourth embodiment.

The observation device 60 is a camera having a finite optical system for obtaining the image of sample S, which is the object, and includes an objective (photography lens) 61, an aperture diaphragm 62 and an image pickup element 63.

The image pickup element 63 converts the image of sample S into an image signal, the image of sample S being obtained by the objective 61. Also, the observation device 60 functions as an observation scope changing unit that performs an observation scope changing process in which the observation scope is changed on the basis of the image signal obtained through the conversion.

The aperture diaphragm 62 is provided at, or near, the pupil position of the objective 61, and functions as a numerical aperture changing unit that changes the numerical aperture on the emission side of the objective 61, i.e., the numerical aperture on the emission side of the optical system included in the observation device 60.

The observation device 60 includes, therein, the aperture diaphragm 62 and a control unit that controls the function, belonging to the observation device 60, of performing an observation scope changing process. The functional configuration of the observation device 60 includes the imaging optical unit, the numerical aperture changing unit, the detection unit, the observation scope changing unit, and the control unit similar to the functional configuration illustrated in FIG. 3. The control unit performs control similar to that performed by the control PC 6 according to the first embodiment, and thereby controls the aperture diaphragm 62 in accordance with the observation scope changing process.

In the observation device 60 as well, the aperture diaphragm 62 is controlled in accordance with the observation scope changing process, and thereby an observation scope changing process can be performed while maintaining necessary and sufficient observation image performance.

While the present embodiment describes an example in which the object is at a finite distance from the objective (photography lens), similar configurations and functions may be employed even when the object is at an infinite distance.

As described above, the present invention can provide a compact and lightweight observation device that can perform observation and image pickup with high-speed and silent switching and that can change the observation scope by a relatively large margin while maintaining necessary and sufficient observation image performance.

Also, in the above embodiments, the securement of the aberration performance of the optical system and the uniformity of the amount of light may be performed together with an imaging process such as shading correction. Further, the present invention may include a function of simultaneously displaying an image that has undergone an imaging process such as a shading correction etc. and an image that has not undergone such a process or a function of simultaneously displaying an image with high magnification and an image with low magnification. Thereby, a search can easily be performed for a specific position in sample S. Note that the imaging process is not limited to a process for the purpose of improving the aberration performance, but the imaging process may be performed together for the purpose of performing an imaging process on a phase difference image when for example a phase difference observation is performed. Note that the image pickup elements of the cameras of the respective embodiments described above are not limited to planar elements but may be curved elements, which are optically designed to facilitate the aberration correction on the projected image plane. Also, the maximum effective scope from which image signals on each image pickup element can be extracted and the scope from which image signals are extracted upon maximum electronic scaling do not have to be quadrangular. When they are not quadrangular, the length equivalent to the above length of a diagonal may be considered to be for example the maximum dimension of the maximum effective scope and the scope from which image signals are extracted.

The above embodiments are specific examples provided to facilitate understanding of the invention, and the present invention is not limited to the embodiments. Various modifications and changes can be made to the observation devices without departing from the spirit of the present invention described in the claims.

What is claimed is:

1. An observation device for observing an object, the observation device comprising:
    an imaging optical system that forms an image based on light from the object;
    a numerical aperture changing unit that changes a numerical aperture on an emission side of the imaging optical system;
    an imaging device that converts the image of the object into image signals, the image of the object being formed by the imaging optical system;
    an observation scope changing unit that performs an observation scope changing process in which an observation scope is changed to a specified scope by changing an extraction scope, the extraction scope being a scope from which the image signals obtained by the imaging device are extracted;
    a display that displays the image signals from the specified scope obtained through the observation scope changing process; and
    a hardware processor that controls the numerical aperture changing unit in accordance with the specified observation scope,
    wherein:
    the image signals are converted through one detection performed by the imaging device,
    the observation scope changing unit adjusts a pixel pitch of the image signals after the observation scope changing process in a pseudo manner such that the display displays the extraction scope for the image signals in a pixel-to-pixel display,
    the hardware processor controls the numerical aperture changing unit based on a numerical aperture in accordance with the pixel pitch, and
    the observation device satisfies a conditional expression of $2 \leq 1.22 \times \lambda / (NAI1 \times P)$ where P is a pixel pitch of the imaging device selected in accordance with the specified observation scope, $\lambda$ is an observation wavelength used by the observation device, and NAI1 is the numerical aperture on the emission side of the imaging optical system.

2. The observation device according to claim 1, wherein the hardware processor controls the numerical aperture changing unit in such a manner that the narrower the specified observation scope is, the higher the numerical aperture is on the emission side of the imaging optical system, and controls the numerical aperture changing unit in such a manner that the wider the specified observation scope is, the lower the numerical aperture is on the emission side of the imaging optical system.

3. The observation device according to claim 1, comprising at least two image pickup elements or at least two image pickup areas, having different pixel pitches, as the imaging device.

4. The observation device according to claim 3, satisfying the conditional expression of $2 \leq 1.22 \times \lambda / (NAI1 \times P)$ where P is a pixel pitch of an image pickup element or a pixel pitch of an image pickup area selected in accordance with the specified observation scope from among the at least two image pickup elements or at least two the image pickup areas, $\lambda$ is the observation wavelength used by the observation device, and NAI1 is the numerical aperture on the emission side of the imaging optical system.

5. The observation device according to claim 1, further comprising:
    an illumination optical system that irradiates the object with light,
    wherein the numerical aperture changing unit is arranged on an illumination optical path, which is an optical path of the light with which the object is irradiated.

6. The observation device according to claim 1, wherein the imaging optical system can be replaced with a different imaging optical system.

7. The observation device according to claim 1, wherein the imaging device can be replaced with a different imaging device.

8. The observation device according to claim 1, wherein an illumination optical system is provided interchangeably with a different illumination optical system.

9. The observation device according to claim 1, wherein the imaging optical system includes an afocal optical system portion.

10. The observation device according to claim 1, wherein the numerical aperture changing unit comprises an aperture diaphragm having an aperture.

11. An observation device for observing an object, the observation device comprising:
    an imaging optical system that forms an image based on light from the object;
    a numerical aperture changing unit that changes a numerical aperture on an emission side of the imaging optical system;
    an imaging device that converts the image of the object into image signals, the image of the object being formed by the imaging optical system;
    an observation scope changing unit that performs an observation scope changing process in which an observation scope is changed to a specified scope by changing an extraction scope, the extraction scope being a scope from which the image signals obtained by the imaging device are extracted;
    a display that displays the image signals from the specified scope obtained through the observation scope changing process; and
    a hardware processor that controls the numerical aperture changing unit in accordance with the specified observation scope,
    wherein the observation device satisfies a conditional expression of $2 \leq 1.22 \times \lambda / (NAI1 \times P)$ where P is a pixel pitch of the imaging device selected in accordance with the specified observation scope, $\lambda$ is an observation wavelength used by the observation device, and NAI1 is the numerical aperture on the emission side of the imaging optical system.

12. The observation device according to claim 11, further comprising:
an illumination optical system that irradiates the object with light,
wherein the numerical aperture changing unit is arranged on an illumination optical path, which is an optical path of the light with which the object is irradiated.

13. The observation device according to claim 11, wherein the imaging optical system can be replaced with a different imaging optical system.

14. The observation device according to claim 11, wherein the imaging device can be replaced with a different imaging device.

15. The observation device according to claim 11, wherein an illumination optical system is provided interchangeably with a different illumination optical system.

16. The observation device according to claim 11, wherein the imaging optical system includes an afocal optical system portion.

17. The observation device according to claim 11, wherein the numerical aperture changing unit comprises an aperture diaphragm having an aperture.

* * * * *